US010534845B2

(12) United States Patent
 Noursalehi et al.

(10) Patent No.: US 10,534,845 B2
(45) Date of Patent: Jan. 14, 2020

(54) SYSTEM AND METHOD FOR OPTIMIZING ELECTRONIC DOCUMENT LAYOUTS

(71) Applicant: SiteHelix, Inc., Salt Lake City, UT (US)

(72) Inventors: Sam Noursalehi, Salt Lake City, UT (US); Yugang Hu, Salt Lake City, UT (US); Allen Joel Dickson, Eldersburg, MD (US)

(73) Assignee: Overstock.com, Inc., Midvale, UT (US)

( * ) Notice: Subject to any disclaimer, the term of this patent is extended or adjusted under 35 U.S.C. 154(b) by 0 days.

(21) Appl. No.: 15/593,040

(22) Filed: May 11, 2017

(65) Prior Publication Data

US 2017/0329747 A1  Nov. 16, 2017

Related U.S. Application Data

(60) Provisional application No. 62/335,050, filed on May 11, 2016.

(51) Int. Cl.
 *G06F 17/00* (2019.01)
 *G06F 17/21* (2006.01)
 *G06N 20/00* (2019.01)
 *G06F 16/93* (2019.01)

(52) U.S. Cl.
 CPC ............ *G06F 17/212* (2013.01); *G06F 16/93* (2019.01); *G06N 20/00* (2019.01)

(58) Field of Classification Search
 CPC . G06F 17/211; G06F 17/212; G06F 17/30867
 See application file for complete search history.

(56) References Cited

U.S. PATENT DOCUMENTS

| | | | | |
|---|---|---|---|---|
| 8,166,155 B1* | 4/2012 | Rachmeler | .......... | G06F 17/3089 709/224 |
| 2012/0233312 A1* | 9/2012 | Ramakumar | ........ | G06Q 10/101 709/224 |
| 2013/0031470 A1* | 1/2013 | Daly, Jr. | ........... | G06F 17/30867 715/243 |
| 2014/0372415 A1* | 12/2014 | Fernandez-Ruiz | ......... | G06F 17/30991 707/722 |
| 2015/0019958 A1* | 1/2015 | Ying | ..................... | G06F 17/211 715/243 |
| 2015/0286742 A1* | 10/2015 | Zhang | .................... | G06Q 30/02 715/252 |

OTHER PUBLICATIONS

Message Passing From Wikipedia, archived May 6, 2016, retrieved from https://en.wikipedia.org/wiki/Message_passing, 4 pages.*

* cited by examiner

*Primary Examiner* — Scott T Baderman
*Assistant Examiner* — Barbara M Level
(74) *Attorney, Agent, or Firm* — Clayton Howarth, P.C.

(57) ABSTRACT

A system and method is provided that ranks and sorts websites, apps, email, or VR environment content in real-time to increase engagement, CTR, conversions, and revenue. A client applies attributes to sections of the digital content. A server system tracks end user inputs and generates optimized layouts for the digital content, such as a webpage. The document layout is ordered or reorganized before or after the document is delivered to the end user.

9 Claims, 8 Drawing Sheets

SYSTEM AND METHOD FOR OPTIMIZING ELECTRONIC DOCUMENT LAYOUTS

CROSS REFERENCE TO RELATED APPLICATIONS

This document claims the benefit of U.S. Prov. Pat. App. No. 62/335,050 filed on May 11, 2016, the entirety of which is hereby incorporated by reference.

BACKGROUND OF THE INVENTION

Field of the Invention

This invention relates to the general field of network delivered digital content, and more specifically toward a system and method that ranks and sorts mobile, web, and email content in real-time to increase customer engagement, click-through rate (CTR), and/or conversions. A client applies attributes to sections of the digital content. A server system tracks end user inputs and generates optimized layouts for the digital content, such as a webpage. The document layout is ordered or reorganized before or after the document is delivered to the end user.

Just as brick and mortar stores optimize their shelf space and floor-sets to increase conversions and order size, the digital world can also optimize the real estate of their websites, apps, emails, or virtual reality (VR) environment to maximize engagement, CTR, conversions, and revenue. Today, mobile, web, and email optimization are primarily done through data analysis, and A/B or multivariate testing. The problem is that these optimizations are manual, non-scalable, and prone to errors.

Manual A/B testing or analytics is how web content optimization has occurred in the past. Analytics, A/B testing, and recommendation platforms can aid developers in optimizing page layout; however, none of these automate the optimization of the user interface. Furthermore, none of these enable real-time layout optimization based upon end-user behavior characteristics.

Thus there has existed a need for a system and method that ranks and sorts mobile, web, and email content in real-time to increase customer engagement, CTR, and/or conversions. Additionally, there is a need for a system that ranks and sorts content in virtual reality platforms, where the layout of a virtual environment can be optimized based on what a user views and interacts with.

SUMMARY OF THE INVENTION

The current disclosure provides just such a solution by having a system that automates the optimization of user interfaces. It restructures the user interface to present the most relevant information. The system can present a unique layout for all users (default), specific segments (cluster) of users, or for a specific user, based on the amount of data available.

Clients integrate their website with this system by adding tracking code to their system. This code tracks the impressions, positions, pixels, clicks, orders, revenue, and even virtual touch or handling of the users of the client's system (website, app, emails, or virtual reality environment). The system then uses randomized testing to rank the positions of content sections and/or subsections, while also ranking and scoring the actual page content. Then, the system places the best content in the best position, and the next best content in the next best position, and so on for the remaining content sections. Machine learning is used to determine the ideal weight of the various metrics used in the score, to maximize the client's key performance indicator (KPI). The KPI may be engagement, conversions, revenue, application signups, email signups, or other performance indicators based on the client's specific needs or specific application of the system.

A time decay function is also used to weigh more recent data more heavily than older data. The current system then uses the content score to sort the content modules (sections) in order, from best performing position to lowest performing position. Within these content sections, the system will also sort subsections of content in the same manner. The sort happens in real-time, and content can be dynamically resized to occupy a smaller or larger modules. The system can also remove content (i.e. sections or subsections) that are not performing well. This could be the result of the content performing below a required threshold (e.g. low conversion or CTR).

In addition, this technology can develop a unique sort for different segments (groups or cohorts) of users. These segments can be passed by the client, or identified by the system itself. In other words, users may experience a unique version of the page, app, email, or VR environment for different geolocations, whether they are new or repeat users, referring URL, or time of day, if it improves the KPI (e.g. CTR, conversion, revenue/impression) being optimized. The segments used can be determined by artificial intelligence (AI) or machine learning (ML) algorithms, and can vary based on the client or the application of the technology.

When data permits, the content sort can also be user specific. In other words, when the system described herein has sufficient data to recommend an optimization to a specific user, it does so. When there is insufficient data, it provides an optimization based upon other criteria or data, such as aggregated data (user segment or default).

Finally, clients of the system select what content modules, or objects, of their page, app, email, or VR environment should be optimized. Furthermore, clients can choose to lock, or pin, content (objects) that they would like to remain static.

It is an object of the invention to provide a system and method for optimizing the placement of content on a webpage, and whether or not to serve that content.

It is another object of the invention to provide a system and method for optimizing webpage content based upon client selected criteria.

It is a further object of this invention to provide a system and method for sorting subsections within a section that is itself sorted on a webpage.

Particular embodiments of the current disclosure have a system for optimizing the layout of an electronic document comprising a database and a processor executing programming logic for interfacing with remote systems, the programming logic configured to provide a content sort service, a track service, and a machine learning process; where the track service accepts end user request data, where the track service stores the end user request data in the database, and where the track service provides the end user request data to the machine learning process; where the machine learning process uses the end user request data to generate and update models, where the models are stored in the database; where the content sort service accepts optimization requests for an electronic document, where the electronic document comprises a plurality of sections, where the content sort service accesses the database to obtain models for the optimization request, where the content sort service selects one or more models from the models obtained from the database; where the content sort service applies the one or more selected models to generate an optimized order for the plurality of sections for the electronic document. The one or more models selected by the content sort service is a randomized model, where the randomized model is used to provide a partial or fully randomized optimized order for the plurality of sections for the electronic document. The content sort service further provides a response to an end user, where the response comprises the optimized order for the plurality of sections for the electronic document. Alternatively, the content sort service further provides a response to a client server, where the response comprises the optimized order for the plurality of sections for the electronic document. Each optimization request for an electronic document comprises data indicating that one or more of the plurality of sections of the electronic document are pinned. The pinned one or more of the plurality of sections of the electronic document are ignored by the content sort service. Each optimization request for an electronic document comprises a key performance indicator, where the content sort service uses the key performance indicator to select the one or more models obtained from the database. The content sort service uses a progressively localized content position randomization to generate an optimized order for the plurality of sections for the electronic document. The track service provides the end user request data to the machine learning process via one or more log files or via a distributed messaging system. At least one of the plurality of sections of the electronic document comprises a plurality of subsections, where the content sort service further applies the one or more selected models to generate an optimized order for the plurality of subsections.

Another embodiment of the current disclosure is a method of optimizing the layout of an electronic document, comprising the steps of: selecting a plurality of sections of the electronic document for optimization; selecting one or more criteria for optimizing the order of the plurality of sections of the electronic document; sending a request to a server system to optimize the plurality of sections of the electronic document using the one or more criteria; and upon receiving an optimization response from the server system, rearranging the sections of the electronic document according to the optimization response received from the server system. The method further comprises the step of resizing the sections of the electronic document. The method further comprises the step of removing one or more sections from the electronic document if it fails to meet predefined minimum criteria. At least one of the plurality of sections of the electronic document comprises a plurality of subsections, where the method further comprises the step of sending a request to a server system to optimize the plurality of subsections of the electronic document using the one or more criteria; and upon receiving a subsection optimization response from the server system, rearranging the subsections according to the subsection optimization response received from the server system. The method further comprises the step of adding one or more attributes to one or more of the plurality of sections of the electronic document.

Further embodiments of the current disclosure have a system for optimizing the layout of an electronic document comprising a processor executing programming logic for interfacing with remote systems, the programming logic configured to: accept a request for an electronic document from an end user system, send an optimization request to a server system for an optimized layout of the electronic document, where the electronic document comprises a plurality of sections; receive an optimized layout response from the server system, rearrange the sections of the electronic document according to the optimized layout response from the server system; and send an electronic document response to the end user system, where the sections of the electronic document are rearranged. The optimization request comprises a key performance indicator. At least one of the sections of the electronic document comprises a plurality of subsections, where the programming logic is further configured to rearrange the subsections according to the optimized layout response from the server system. The electronic document response sent to the end user system comprises computer readable instructions, where the computer readable instructions comprise instructions to send input data generated by the end user to the server system.

As used herein, a client is an entity that provides webpage, app, email, VR, or other electronic document content to end users and sets the criteria on the server system that generates the optimized webpage, app, email, VR, or other electronic document content order or layout. An end user, or simply user, is the entity that is requesting and viewing the electronic document content of a client. The webpage layout is optimized for the end user. The electronic document, which includes without limitation webpage, app, email, and VR content, has two or more sections and/or subsections that can be reorganized or optimized.

While particular programming languages, file structures, databases, and operating systems may be discussed herein, other languages, file structures, databases, and operating systems may be implemented without departing from the scope of the current disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flowcharts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
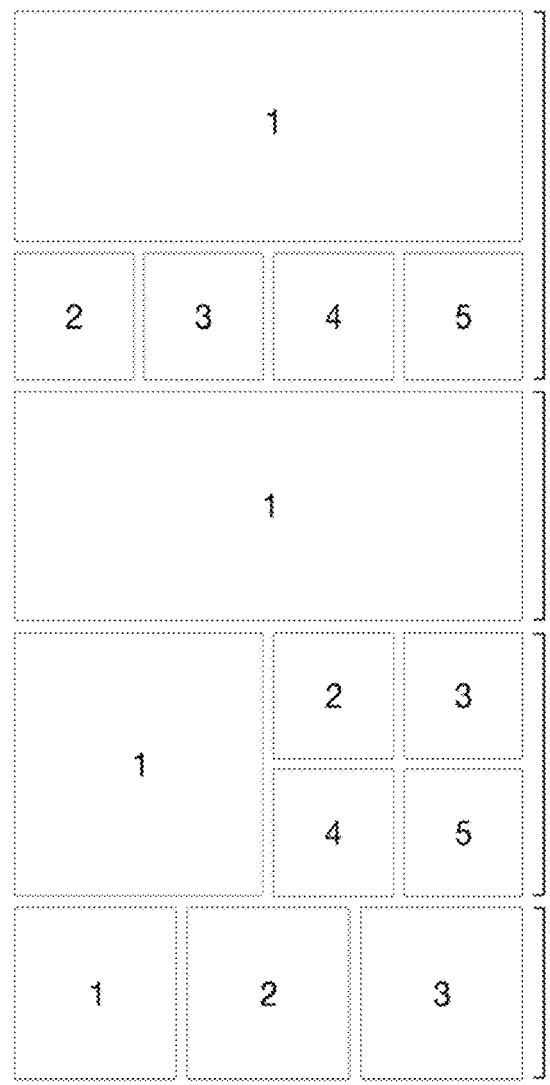
FIG. 1 is diagram showing an original page layout according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is diagram showing an original page layout according to selected embodiments of the current disclosure. The page includes a header and a footer, with four sections therebetween labeled A, B, C, and D. Each section may have 1 or more subsections therein. For example, section A has subsections 1, 2, 3, 4, and 5; section B has just one subsection, section C has subsections 1, 2, 3, 4, and 5, and section D has subsections 1, 2, and 3. Each section may have a different layout, such that the subsections are arranged differently compared to other sections.

Figure 2:
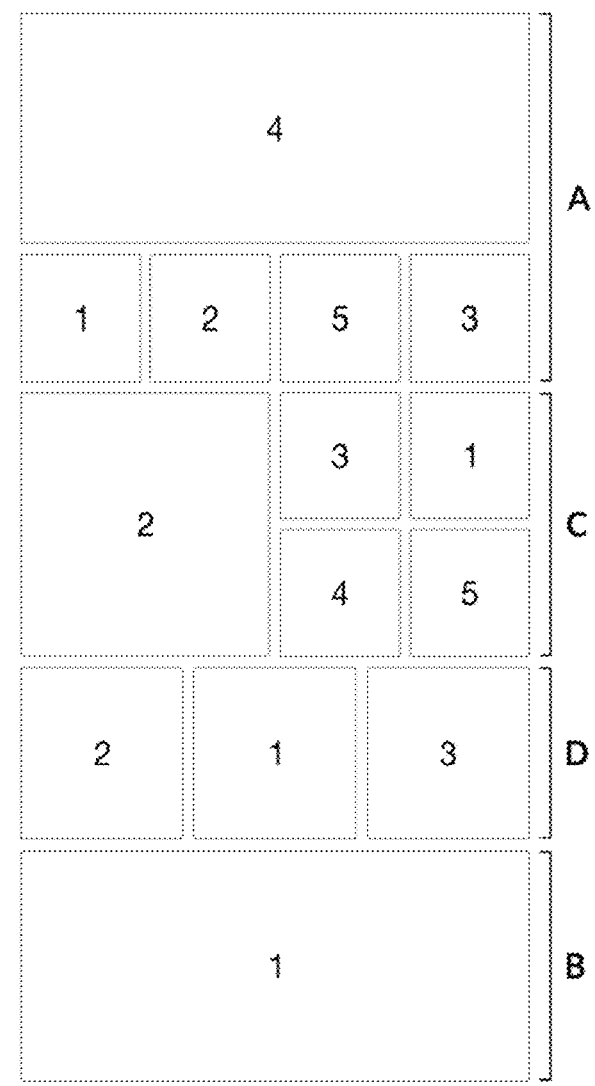
FIG. 2 is a diagram showing an optimized page layout according to selected embodiments of the current disclosure.

FIG. 2 is a diagram showing an optimized page layout according to selected embodiments of the current disclosure. As with the original page layout, the optimized page layout includes a header at the top and a footer at the bottom. However, the placement of the sections has been modified to optimize the layout. While section A remains at the top of the page, it is now followed by section C. Section D follows section C, with the last Section B placed at the bottom. Furthermore, the subsections within each section have been optimized as well. For example, section A previously had a larger subsection 1, with subsections 2 through 5 beneath it. Now, however, section A has a larger subsection 4, with subsections 1, 2, 5, and 3 beneath it. In fact, each section, subsection, or both may be resized to fit within the available content area. As shown in FIGS. 1, and 2, subsections 1 and 2 are resized to fit the allocated space.

Figure 3:
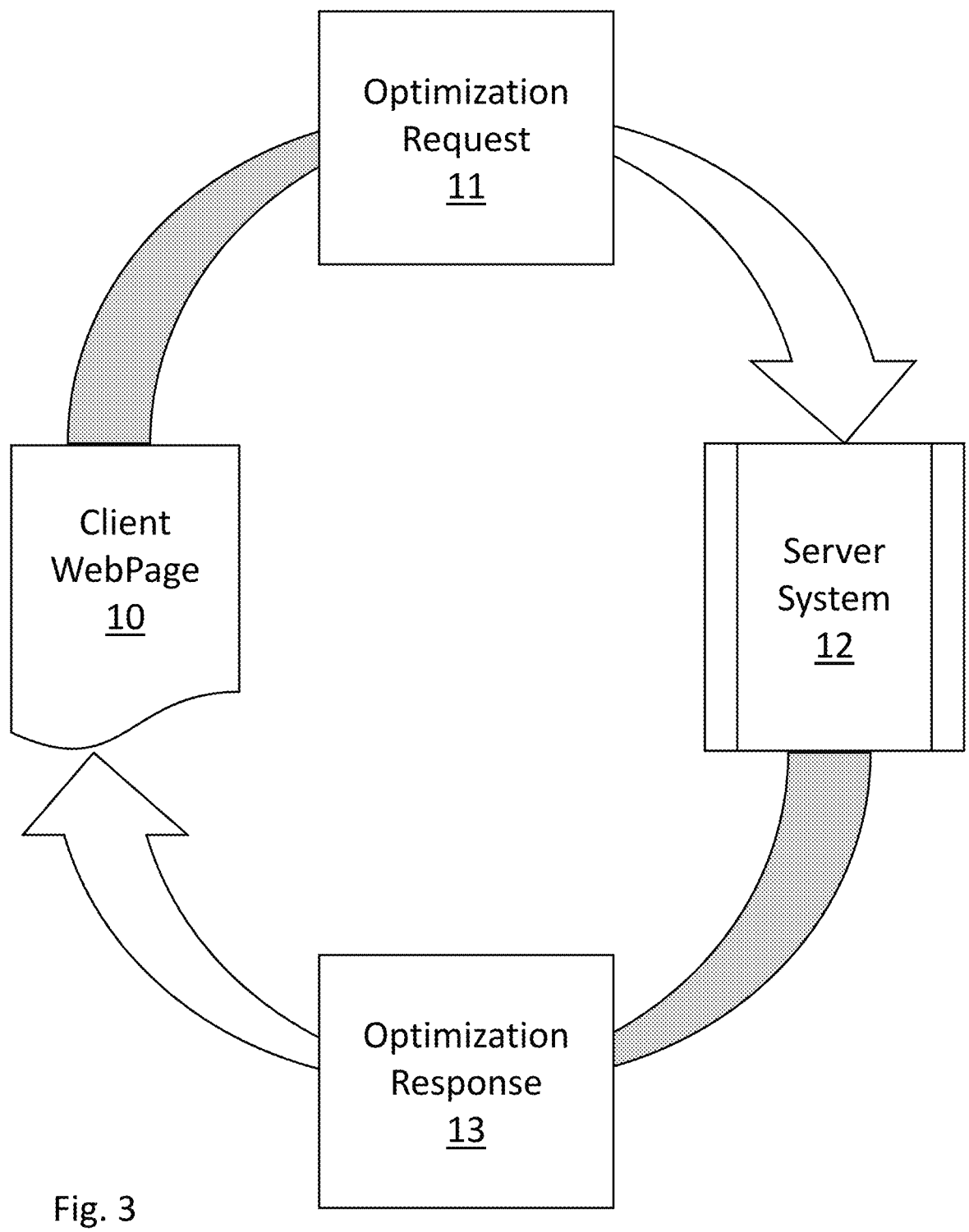
FIG. 3 is a flowchart showing the interaction between the client webpage and the server system according to selected embodiments of the current disclosure.

FIG. 3 is a flowchart showing the interaction between the client webpage and the server system according to selected embodiments of the current disclosure. The client webpage 10 sends an optimization request 11 to a server system 12. The server system 12 processes that request, and returns an optimization response 13 to the client webpage to act upon. The client webpage uses the optimization response to optimize the webpage layout.

Figure 4:
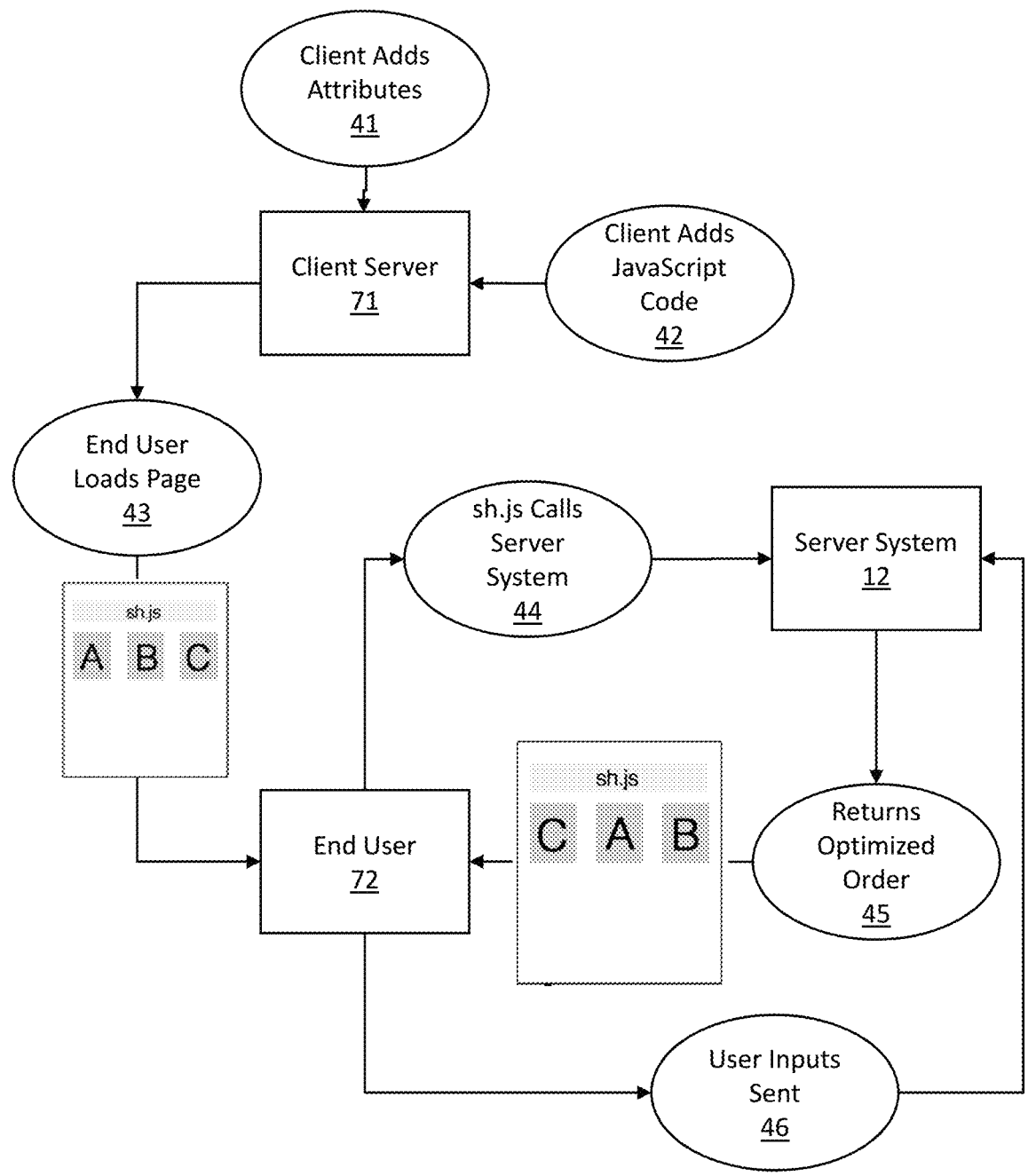
FIG. 4 is a flowchart showing a process for providing an optimized webpage layout using a client-side integration according to selected embodiments of the current disclosure.

FIG. 4 is a flowchart showing a process for providing an optimized webpage layout using a client-side integration according to selected embodiments of the current disclosure. Attributes are added 41 by the client to the client's webpage on the client's server 71. These attributes apply to particular sections or subsections of a webpage that the client wants optimized by the server system 12. Additionally, the client adds JavaScript code 42, or alternatively, a reference to download a JavaScript file that includes the JavaScript code. The JavaScript code includes computer readable instructions for interacting with the server system (such as tracking user behavior) and optimizing the content of the webpage. An end user 72 (or the end user's system or browser) then loads the client's webpage 43.

After loading the page, including the instructions contained in the JavaScript code or file, the instructions are executed and a request is made 44 to the server system 12 to obtain an optimized layout or order for the webpage downloaded by the end user 72. The server system 12 generates such an optimized order or layout, and returns a response with the optimized order 45 back to the end user 72. The instructions contained in the JavaScript code then optimize the webpage order or layout based upon the data received from the server system 12. The sections and subsections of the webpage are reorganized and moved around to optimize the content based upon the attributes set by the client. End user inputs, including without limitation impressions, clicks, and orders, are sent 46 to the server system 12. This input data is used to generate future optimized content for that particular end user, as well as other end users.

Figure 5:
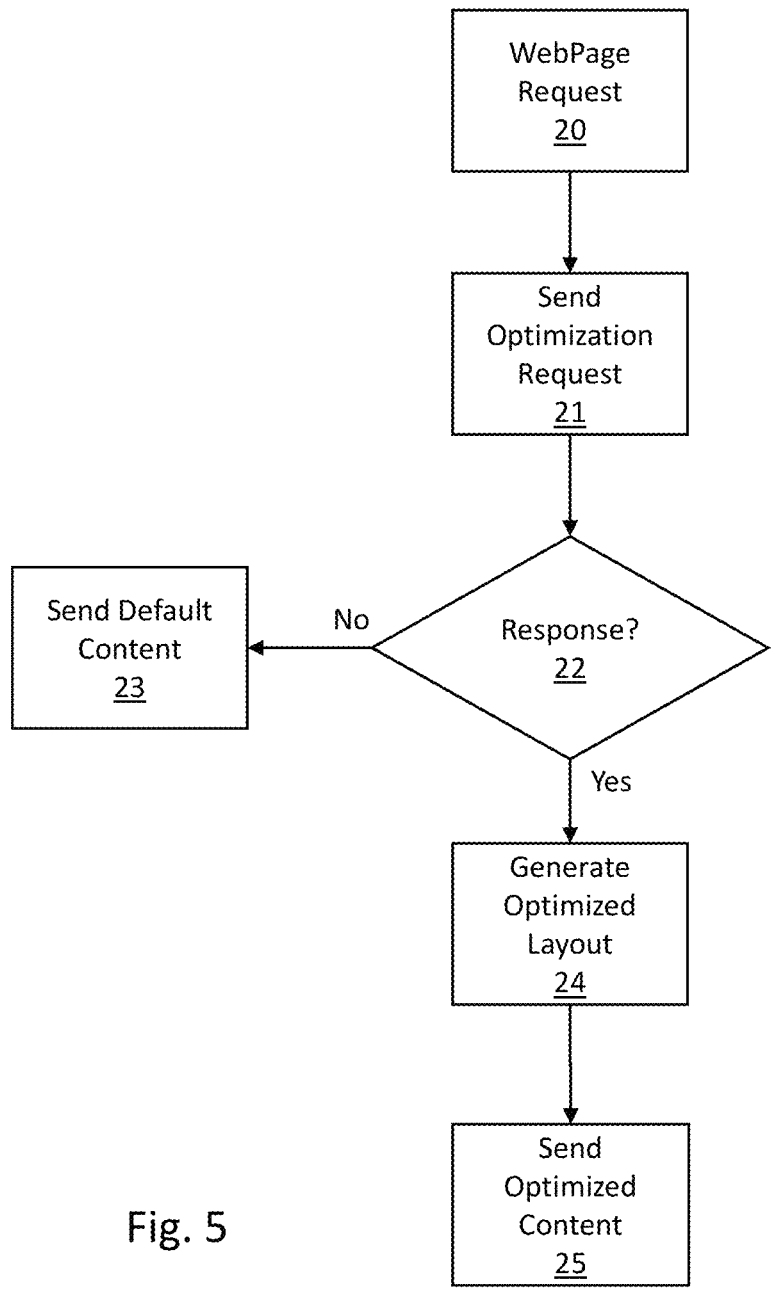
FIG. 5 is a flowchart showing an alternative process for providing an optimized webpage layout according to selected embodiments of the current disclosure.

FIG. 5 is a flowchart showing a process for providing an optimized webpage layout according to selected embodiments of the current disclosure. An end user makes a request to view a particular webpage, and that webpage request 20 is processed by a client server. The client server sends an optimization request 21 to the server system, which processes and generates optimization responses, discussed in more detail below. If the client server does not receive a response 22, or the response 22 is invalid, the client server sends default content 23 to the end user. If, on the other hand, the client server receives a valid response 22, it generates an optimized layout 24 using the response from the server system. For example, the client server will use the data in the response to organize a webpage from its original format, such as the one shown in FIG. 1, to produce the layout in an optimized format, such as the one shown in FIG. 2. The optimized content is then sent 25 to the end user.

Figure 6:
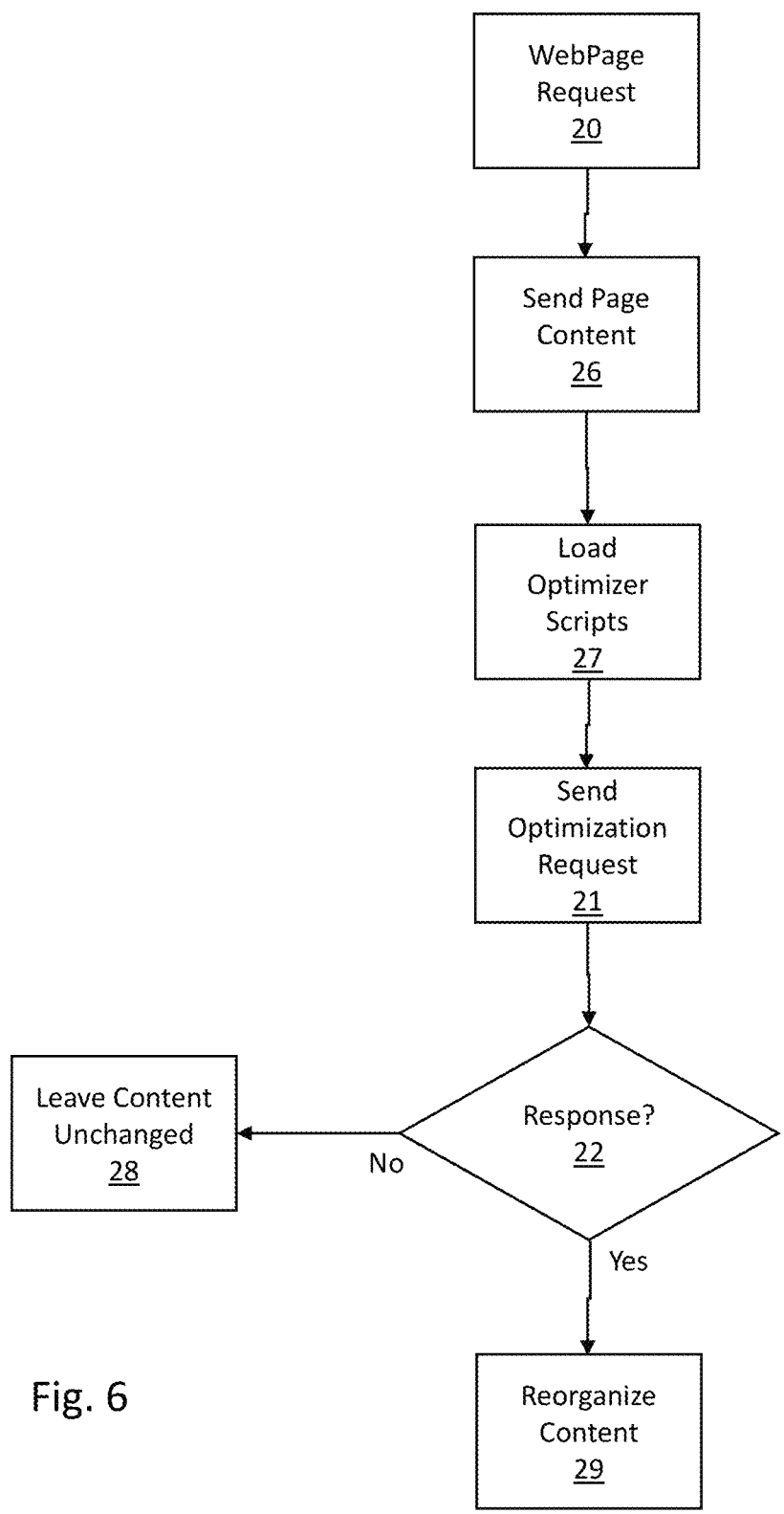
FIG. 6 is a flowchart showing another alternative process for providing an optimized webpage layout according to selected embodiments of the current disclosure.

FIG. 6 is a flowchart showing an alternative process for providing an optimized webpage layout according to selected embodiments of the current disclosure. As in FIG.

5, an end user makes a request to view a particular webpage, and that webpage request 20 is processed by a client server. However, in this figure, the client server sends the page content 26 to the end user, which includes a reference to one or more scripts used to access and interact with the server system. The end user, or more specifically, the browser of the end user, loads the optimizer scripts 27 and then sends an optimization request 21 to the server system. If no response 22 is received from the server system, or an invalid response 22 is received from the server system, the page content 22 originally received by the end user is left unchanged 28. If, on the other hand, a valid response 22 is received from the server system, the content received from the client server is reorganized 29 by the optimizer scripts to produce an optimized layout for the end user.

Figure 7:
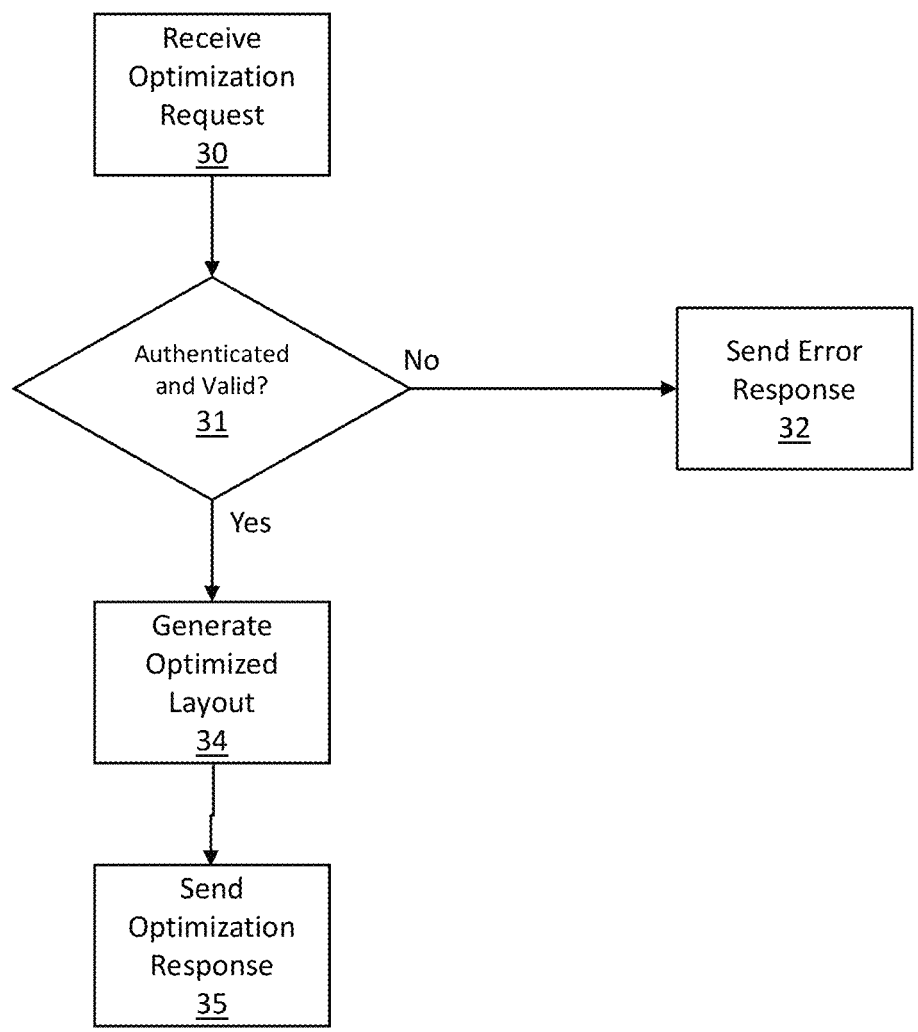
FIG. 7 is a flowchart showing a process executed on a server system for handling optimization requests from remote clients.

FIG. 7 is a flowchart showing a process executed on a server system for handling optimization requests from remote clients. The server system receives an optimization request 30, and then determines whether the request is authentic 31. In other words, it determines if the request is made from a webpage with a valid account that has been configured properly. If the server system determines that the request is not authentic or not valid 31, then the server system sends an error response 32. If, on the other hand, the server system determines that the request is authentic and valid 31, then the server system proceeds in generating an optimized sort order for an optimized layout 34. It then sends the optimized sort order response 35 back to the requestor.

Figure 8:
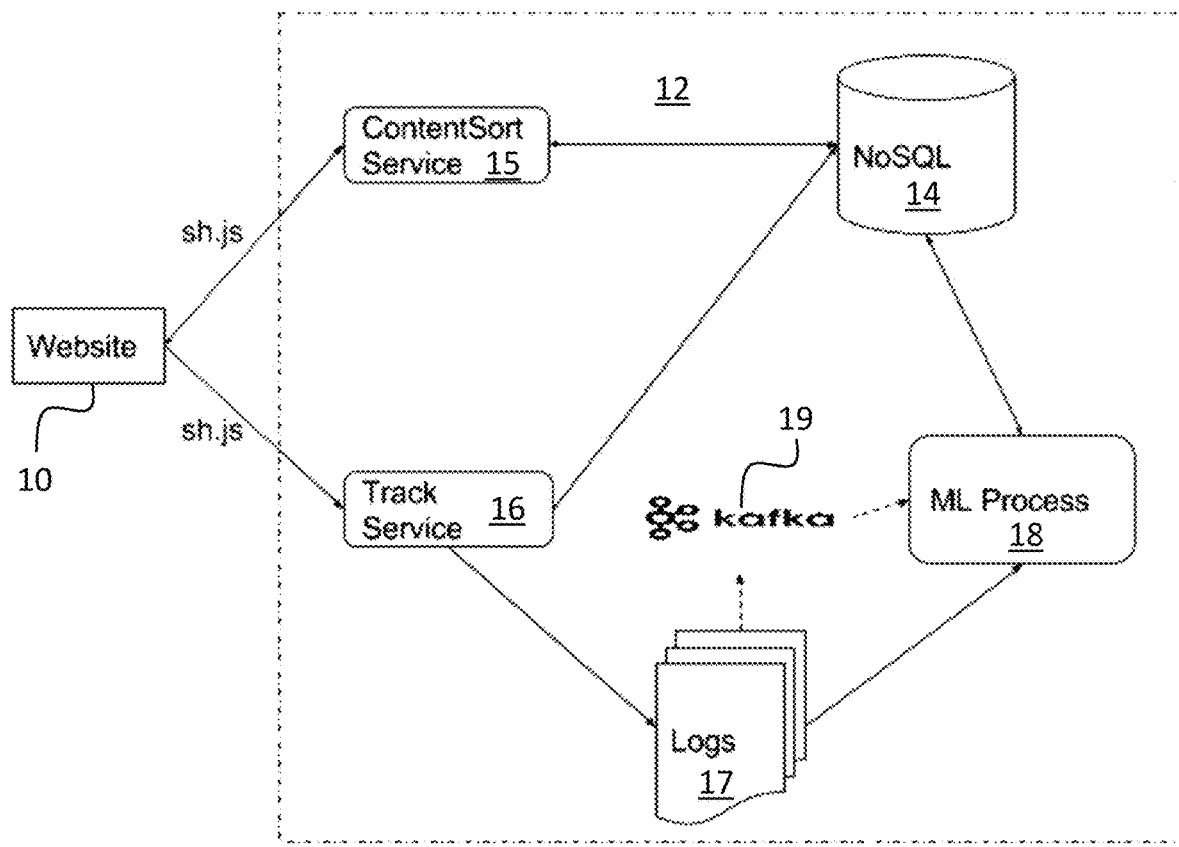
FIG. 8 is diagram showing the interactions between the client website and the server system according to selected embodiments of the current disclosure.

FIG. 8 is diagram showing the interactions between the client website and the server system according to selected embodiments of the current disclosure. The client website 10 interacts with the server system 12, whether through the client server or the end user's machine, through at least two services: a content sort service 15, and a track service 16. The content sort service 52 is a runtime component that returns the optimized sort order of the sections and/or subsections of a requested webpage. The track service 16 is a web service that tracks specific events, such as impressions and clicks. It writes events to a log file 17 as well as to the database 14. The log files may be written to in JSON format, and the data stored in a NoSQL database. The database 14 stores tracking information and is used by the content sort service 15 to provide optimized orders of sections and/or subsections of webpages. A machine learning (ML) process 18 generates aggregate data based on the tracked events as well as generates models based on online learning algorithms, discussed in more detail below. The generated models are stored into the database 14.

The content sort process begins when a client webpage 10 sends a request to the content sort service 15 of the server system 12 for an optimized layout. The content sort service 15 accesses the database 14 to determine whether the webpage is configured correctly, including without limitation whether the client webpage is authorized to access this service and if so, what KPI have been set for this particular webpage or, alternatively, whether there is sufficient data to automatically determine which KPI(s) to use based upon the different weights assigned to each KPI by the client. Subsequently, the content sort service 15 accesses the database 14 to find all applicable models for this particular request given the KPI(s) that are to be used. Models describe the predicted performance of content at different sort positions, as well as the relative strength of different positions within the webpage. The content sort service 15 generates scores for each of these models and uses the scores to determine which models to use. For example, each applicable model is given a score relative to its perceived ability to generate the optimal layout for a particular webpage for the particular user given the KPI(s) that are set for that particular webpage. The model with the best score is used to determine the sort order for the sections and/or subsections of this webpage.

Embodiments of the current disclosure also provide for the content sort process to designate sections or subsections for removal. If a particular model determines that a certain section or subsection does not meet or exceed a predefined minimum score or criteria, that section or subsection is removed from the layout. The removed content may be replaced with other content, or is simply not displayed in the electronic document.

For each request to the content sort service 15, the request will be randomly assigned to return either a "learning" response or an "optimized" response. For requests that are assigned to return an optimized response, the optimized sort order data representing the optimized order of the sections and/or subsections is returned to the webpage. For requests that are assigned to return a learning response, the optimized sort order data is at least partially randomized to allow the machine learning process to more efficiently test and predict an optimal content sort order. The randomization process for learning requests uses a progressively localized content position randomization whereby new content is randomly ordered across a wide range of positions, and as impression volumes increase, the content is randomly ordered across a progressively narrower range of positions around the calculated optimal position. This is designed in a way so as to minimize the learning costs for the machine learning algorithm. The resulting randomized sort order data representing the order of sections and/or subsections is returned to the webpage.

The track service 16 takes end user request or input data, such as impressions and clicks, and saves it to the database 14 as well as to log file(s) 17.

The machine learning process 18 is run continuously, at set increments of time, or at variable increments of time. The machine learning process 18 looks at log files 17 to process new events (end user request data) as they come in or shortly thereafter. Instead of reading log files, the machine learning process 18 can access the end user request data events using a distributed messaging system/service 19, such as Apache Kafka. In either instances, the machine learning process 18 aggregates data based on event type, such as impressions, clicks, conversion, revenue, and a/b test. Models are generated and regenerated using online learning algorithms, discussed in more detail below. The machine learning process 18 may also evaluate multiple algorithms to determine which model is most likely to provide the best optimized layout. Furthermore, multiple models may be combined together using Ensemble Learning methodologies, such as bucket of models, to provide more accurate models. The models generated by the machine learning process 18 are saved to the database 14 for use by the content sort service 15.

Machine learning algorithms, such as sequential learning, are used to create models for predicting and generating an optimized order of sections and/or subsections of the webpage. The content sort service uses these models to generate the optimized order data in response to requests for an optimized webpage layout.

In sequential learning, the algorithm attempts to minimize the error between a predicted optimized layout and an actual optimized layout. The machine learning process receives input data, such as from the log file or distributed messaging system. It uses this input to make a prediction of the optimized layout, or in other words, creates a model that generates an optimized layout. The optimized layout is displayed to an end user. The end user interacts with the layout, and generates additional end user request data, which is then received by the machine learning process. The machine learning process evaluates the error in its optimized layout, and updates its model to provide an improved model to generate optimized layouts.

By way of example, the machine learning process receives input data from a webpage with three sections: A, B, and C. It generates a model and saves that model to the database. An end user visits the webpage, and the webpage requests an optimized layout. The content sort service is looking to optimize click through by the user, that is, the webpage should be optimized such that the user clicks on at least one of the sections to travel to another page. Using the model generated by the machine learning process, the content sort service determines that the optimal layout is section B followed by section C, which is then followed by section A. This order data is delivered to the webpage, which is reordered and displayed to the end user. An optimal page layout would have the user clicking on the first section, that is, section B. However, the end user does not click on section B or section C, but rather clicks on the last section A. Another end user that is displayed this same layout does not click on any of the sections. These events are sent to the track service, which distributes the data to the machine learning process through log files or a distributed messaging system/service. The machine learning process evaluates the event data and determines that the optimized layout that should have been sent to the end users was section A followed by section B, which should have been followed by section C. The machine learning process updates its model accordingly, and saves it to the database.

The client selects which layouts it would like optimized, and the criteria or KPI used to optimize those layouts. Instead of selecting a specific KPI, the client may set an order of KPI to be used, or even apply a preference or weight to each KPI. The content sort service will then use the preferences or weights of each KPI to determine which model to use to provide the optimized order to generate the optimized layout of the web page.

In addition to selecting which sections should be optimized, users may also "pin" or select certain sections that should remain static or stationary relative to other sections. This can be helpful when a client wishes a particular section to be first, last, or follow or precede another section.

When a section is pinned, this section can be completely ignored. The optimization request leaves out the section in its request to the content sort service, and the content sort service returns an optimized sort order for the sections without regard to the pinned section. For example, a header section that is always displayed first, or a footer section that is always displayed last, is considered "pinned" and can be ignored by the system. Alternatively, the pinned section may be included in the request to the content sort service, but with a flag or an attribute that signifies the particular section has been pinned, and how it has been pinned (for example, first, last, or relative to another section). This may be relevant data to the content sort service to determine the model and/or may be used as input to the model to determine the optimized sort order. For example, when a particular section is pinned first, that may modify the optimal order generated by the models for a particular end user.

Figure 9:
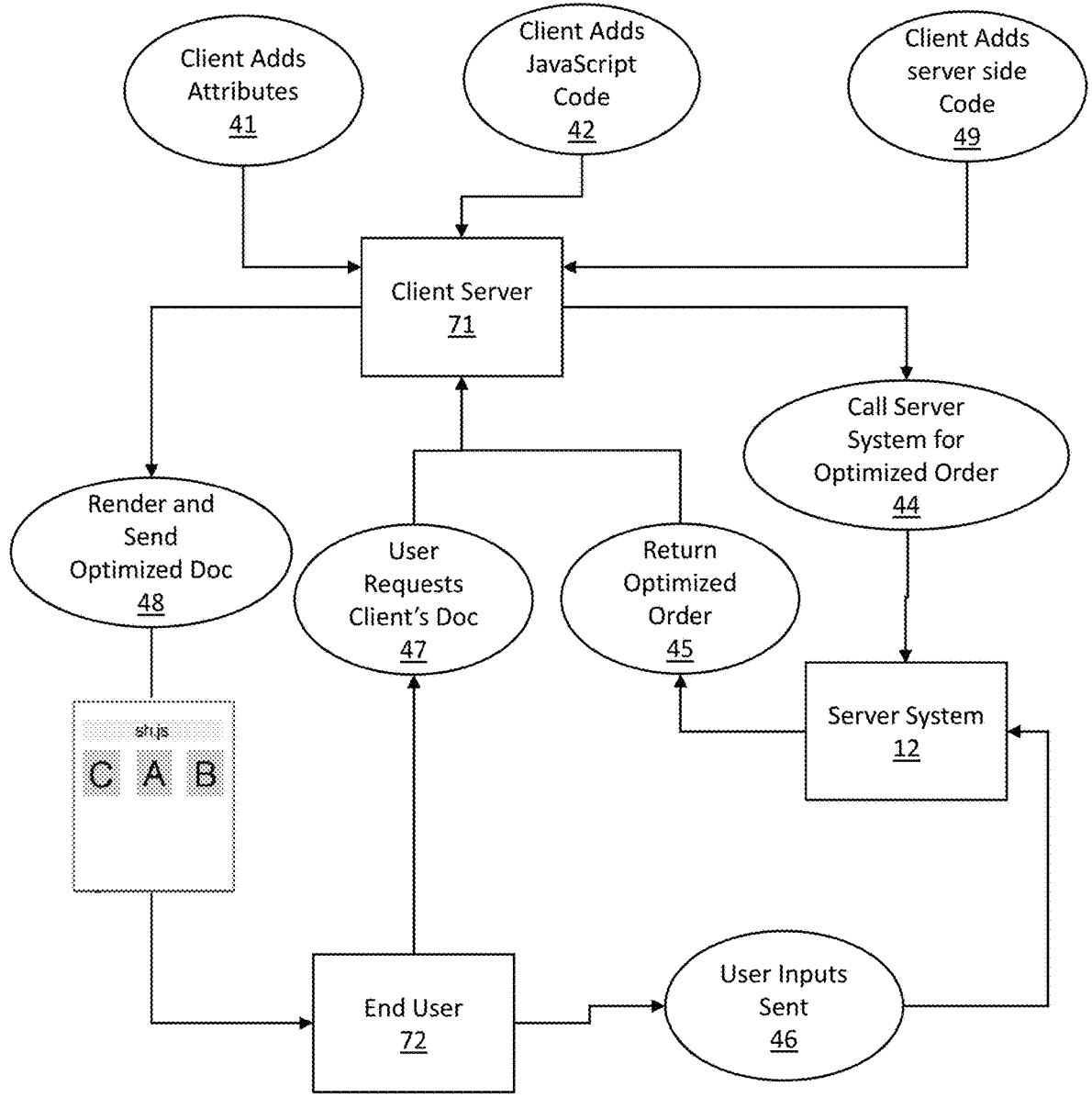
FIG. 9 is a flowchart showing a process for providing an optimized webpage layout using server-side processes according to selected embodiments of the current disclosure.

FIG. 9 is a flowchart showing a process for providing an optimized webpage layout using server-side processes according to selected embodiments of the current disclosure.

The client adds attributes 41 to the sections and subsections of the electronic document (e.g., website) residing on the client's server 71 that the client wants optimized. The client also adds a JavaScript code or file 42 to their website or electronic document distribution system. This file is used to track user behavior (e.g. clicks, impressions, conversions, etc.). Additionally, the client installs a server-side script or code 49 on the client's server(s) that is responsible for the optimization of the electronic document. The client's website and server are then ready to accept requests. A user requests the client's page. The client's server makes a request to the content sort service of the server system to get the optimized order for the electronic document 44. The content sort service of the server system generates (as discussed above) and then returns the requested optimized order data 45, and the client's server 71 (through the instructions provided for in the server-side script or code on the client's server(s)) compares the optimized order with the current electronic document and moves the necessary elements. The client server 71 renders the optimized electronic document with the newly ordered elements and provides the electronic document to the end user 48. Inputs generated by the user while interacting with the electronic document (e.g., impressions, clicks, orders, etc.) are sent 46 to the track service of the server system 12 (per the instructions provided for in the JavaScript file) such that the server system may calculate optimized sorts and ordering for subsequent requested electronic documents.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

That which is claimed:

1. A system for optimizing the layout of an electronic document comprising a database and a processor executing programming logic for interfacing with remote systems, the programming logic configured to provide a content sort service, a track service, and a machine learning process;

where the track service accepts end user request data, where the track service stores the end user request data in the database, and where the track service provides the end user request data to the machine learning process;

where the machine learning process uses the end user request data to generate and update models, where the models are stored in the database;

where the content sort service accepts optimization requests for the electronic document, where the electronic document comprises a plurality of sections, where the content sort service accesses the database to obtain models for the optimization request, where at least one of the models obtained from the database uses a progressively narrowed range of content position randomization to generate an optimized order for the plurality of sections for the electronic document, where the content sort service selects one or more models from the models obtained from the database; where the content sort service applies the one or more selected models to generate an optimized order for the plurality of sections for the electronic document.

2. The system of claim 1, wherein the content sort service further provides a response to an end user, where the response comprises the optimized order for the plurality of sections for the electronic document.

3. The system of claim 1, wherein the content sort service further provides a response to a client server, where the response comprises the optimized order for the plurality of sections for the electronic document.

4. The system of claim 1, wherein each optimization request for an electronic document comprises data indicating that one or more of the plurality of sections of the electronic document are pinned.

5. The system of claim 4, wherein the pinned sections of the electronic document are ignored by the content sort service.

6. The system of claim 1, wherein each optimization request for an electronic document comprises a key performance indicator, where the content sort service uses the key performance indicator to select the one or more models obtained from the database.

7. The system of claim 1, wherein the track service provides the end user request data to the machine learning process via one or more log files.

8. The system of claim 1, wherein the track service provides the end user request data to the machine learning process via a distributed messaging system.

9. The system of claim 1, wherein at least one of the plurality of sections of the electronic document comprises a plurality of subsections, where the content sort service further applies the one or more selected models to generate an optimized order for the plurality of subsections.

* * * * *